(12) United States Patent
Liu

(10) Patent No.: US 12,711,534 B2
(45) Date of Patent: Aug. 18, 2026

(54) METHOD AND APPARATUS FOR PRESENTING INFORMATION, COMPUTER DEVICE, AND STORAGE MEDIUM

(71) Applicant: BEIJING BYTEDANCE NETWORK TECHNOLOGY CO., LTD., Beijing (CN)

(72) Inventor: Yun Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 18/725,076

(22) PCT Filed: Mar. 15, 2023

(86) PCT No.: PCT/CN2023/081507

§ 371 (c)(1),
(2) Date: Jun. 27, 2024

(87) PCT Pub. No.: WO2023/202272

PCT Pub. Date: Oct. 26, 2023

(65) Prior Publication Data

US 2025/0173773 A1 May 29, 2025

(30) Foreign Application Priority Data

Apr. 18, 2022 (CN) ......................... 202210404766.0

(51) Int. Cl.
*G06Q 30/0601* (2023.01)

(52) U.S. Cl.
CPC ..... *G06Q 30/0631* (2013.01); *G06Q 30/0643* (2013.01)

(58) Field of Classification Search
CPC ...................... G06Q 30/0631; G06Q 30/0643; G06F 9/451; G06F 16/9535
See application file for complete search history.

(56) References Cited

U.S. PATENT DOCUMENTS 6,853,982 B2 * 2/2005 Smith ................ G06Q 30/0253 705/26.7
10,021,458 B1 * 7/2018 Taylor ................ H04N 21/2187
(Continued)

FOREIGN PATENT DOCUMENTS

CN 104239495 A 12/2014
CN 106202115 A 12/2016
(Continued)

OTHER PUBLICATIONS

Tag_recommendation_model_using_feature_learning_via_word_embedding (Year: 2021).*
(Continued)

*Primary Examiner* — Gautam Ubale
(74) *Attorney, Agent, or Firm* — BakerHostetler

(57) ABSTRACT

The present invention provides an information display method and apparatus, a computer device, and a storage medium. The method comprises: in response to a browsing request for a target page, obtaining a dynamic tag of a target search recommendation word, wherein the dynamic tag is determined on the basis of state information of a target object corresponding to the target search recommendation word; determining a tag display form of the dynamic tag in the target page on the basis of a recommendation type of the target search recommendation word; and displaying the target search recommendation word and the dynamic tag of the target search recommendation word in the target page according to the tag display form.

20 Claims, 6 Drawing Sheets

(56) References Cited

U.S. PATENT DOCUMENTS

| | | | | |
|---|---|---|---|---|
| 11,062,369 | B2 * | 7/2021 | Johnson | G06Q 30/0621 |
| 2006/0129446 | A1 * | 6/2006 | Ruhl | G06Q 30/0282 705/306 |
| 2013/0311306 | A1 * | 11/2013 | Liu | G06Q 30/02 707/E17.108 |
| 2014/0280107 | A1 * | 9/2014 | Heymans | G06F 16/9535 707/723 |
| 2016/0360382 | A1 * | 12/2016 | Gross | H04W 4/029 |
| 2017/0243234 | A1 * | 8/2017 | Bajaj | G06Q 30/0201 |
| 2018/0268454 | A1 * | 9/2018 | Johnson | G06Q 30/0621 |
| 2018/0329582 | A1 * | 11/2018 | Clediere | G06Q 30/0241 |
| 2019/0147003 | A1 * | 5/2019 | Levy | G06F 16/951 707/706 |
| 2021/0006422 | A1 * | 1/2021 | Rubinstein | G06Q 10/10 |
| 2021/0365521 | A1 * | 11/2021 | Yusuf | G06F 16/248 |
| 2022/0155940 | A1 * | 5/2022 | Olbrich | G06Q 30/0631 |
| 2024/0121608 | A1 * | 4/2024 | Johnson | H04W 12/068 |
| 2025/0173773 | A1 * | 5/2025 | Liu | G06Q 30/0631 |
| 2026/0087783 | A1 * | 3/2026 | Jain | G06V 10/774 |

FOREIGN PATENT DOCUMENTS

| | | | |
|---|---|---|---|
| CN | 111882388 | A | 11/2020 |
| CN | 112307366 | A | 2/2021 |
| CN | 113111286 | A | 7/2021 |
| CN | 113157970 | A | 7/2021 |
| CN | 113344665 | A | 9/2021 |
| CN | 113590972 | A | 11/2021 |
| CN | 113779408 | A | 12/2021 |
| CN | 113849682 | A | 12/2021 |
| CN | 114119153 | A | 3/2022 |
| CN | 114742616 | A | 7/2022 |

OTHER PUBLICATIONS

18 Dynamic Tags We Use to Get Smarter Keyword Data . . . _ Workshop Digital (Year: 2021).*

Smart_Editor_A_Webpage_Enhancer_Tool_for_Seo_on_Page_ Recommendations_with_Page_View_Stats (Year: 2018).*

International Patent Application No. PCT/CN2023/081507; Int'l Search Report; dated Jun. 9, 2023; 2 pages.

First Office Action for Chinese Application No. 202210404766.0, mailed Dec. 17, 2024, 29 pages.

* cited by examiner

Figure 3:
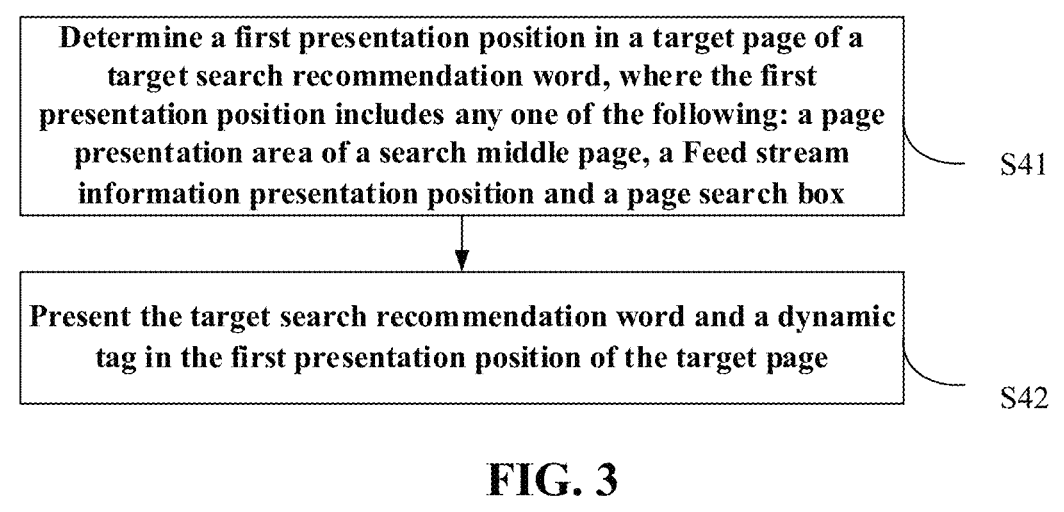

Determine a first presentation position in a target page of a target search recommendation word, where the first presentation position includes any one of the following: a page presentation area of a search middle page, a Feed stream information presentation position and a page search box

S41

Present the target search recommendation word and a dynamic tag in the first presentation position of the target page

METHOD AND APPARATUS FOR PRESENTING INFORMATION, COMPUTER DEVICE, AND STORAGE MEDIUM

CROSS-REFERENCE TO RELATED APPLICATION(S)

The application is a U.S. National Stage Application of PCT International Application No. PCT/CN2023/081507, filed on Mar. 15, 2023, which claims the priority to Chinese Patent Application No. 202210404766.0 filed with the Chinese Patent Office on Apr. 18, 2022, and entitled "Method and Apparatus for Presenting Information, Computer Device, and Storage Medium", the disclosures of which are incorporated herein in their entireties by reference.

FIELD

The disclosure relates to the technical field of computers, in particular to a method and apparatus for presenting information, a computer device, and a storage medium.

BACKGROUND

With the development and popularization of Internet technology, online shopping has become a preferred shopping mode since it is free of time and geographical restrictions. Related technology can push search words to a user in related pages. As static recommendation information, the search words describe static information of target goods, for example, names or key description information of the goods. In this case, the user cannot know a recommendation reason of the search word on an application. For example, the user will not trigger the search word since offer information of a search object corresponding to the search word is unavailable, reducing a trigger rate of such a search word.

SUMMARY

Examples of the disclosure at least provide a method and apparatus for presenting information, a computer device, and a storage medium.

In a first aspect, the example of the disclosure provides a method for presenting information. The method includes: obtaining a dynamic tag of a target search recommendation word in response to a request for browsing a target page, where the dynamic tag is determined based on state information of a target object corresponding to the target search recommendation word; determining a tag presentation form of the dynamic tag in the target page based on a recommendation type of the target search recommendation word; and presenting the target search recommendation word and the dynamic tag of the target search recommendation word in the target page according to the tag presentation form.

In an optional implementation, the target search recommendation word corresponds to a plurality of target objects, and the plurality of target objects are objects that belong to at least one object category and are determined based on an interactive operation between a user and the target page, where the interactive operation includes at least one of the following: a browsing operation, a purchasing operation, a bookmarking operation and a searching operation.

In an optional implementation, under the condition that the state information includes state information belonging to a plurality of state dimensions, the method further includes: obtaining updated information of state information of the target object in respective state dimensions, where the state dimension includes at least one of the following: an offer state, a live streaming (LS) state and an updated state; determining a target state dimension that satisfies a recommendation requirement based on a state dimension to which state information of a historical operation object of the user in the target page belongs; and determining the dynamic tag of the target search recommendation word based on updated information of state information in the target state dimension.

In an optional implementation, the method further includes: determining search recommendation words that have updated dynamic tags from a plurality of preset search recommendation words and obtaining initial search recommendation words before the obtaining the dynamic tag of the target search recommendation word; and determining the target search recommendation word from the initial search recommendation words based on page related information of the target page, where the page related information includes page content of the target page and/or a searching operation in the target page by a user within a preset period.

In an optional implementation, the presenting the target search recommendation word and the dynamic tag of the target search recommendation word in the target page according to the tag presentation form includes: determining a first presentation position in a target page of a target search recommendation word, where the first presentation position includes any one of the following: a page presentation area of a search middle page, a Feed stream information presentation position and a page search box; and presenting the target search recommendation word and the dynamic tag in the first presentation position of the target page.

In an optional implementation, under the condition that the target search recommendation word is a graphic recommendation word, and the first presentation position is a first page presentation area of the search middle page, the determining a first presentation position of the target search recommendation word in the target page includes: obtaining an operation level of a browsing operation by a user on an object that matches the target object within a first period, where the operation level is configured to indicate an operation frequency of the browsing operation; and determining the first page presentation area from page presentation areas of the search middle page based on the operation level.

In an optional implementation, under the condition that the first page presentation area includes a picture presentation area and a text presentation area, the presenting the target search recommendation word and the dynamic tag in the first presentation position of the target page includes: presenting picture information of the graphic recommendation word in the picture presentation area, where the picture information is a preview picture of the target object; presenting text information of the graphic recommendation word in the text presentation area, where the text information is key description information of the target object; and determining a first tag presentation area in the picture presentation area, and presenting the dynamic tag in the first tag presentation area.

In an optional implementation, under the condition that the target search recommendation word is a text recommendation word, and the first presentation position is a second page presentation area of the search middle page, the presenting the target search recommendation word and the dynamic tag in the first presentation position of the target page includes: presenting the text recommendation word in the second page presentation area, where the text recommendation word is search keyword of a corresponding target object; and presenting the dynamic tag at a position, corresponding to the second page presentation area, in the target page.

In an optional implementation, under the condition that the first presentation position is a Feed stream information presentation position, the presenting the target search recommendation word and the dynamic tag in the first presentation position of the target page includes: presenting a preview picture of the target object at a first presentation sub-position of the Feed stream information presentation position of the target page; presenting key description information of the target object at a second presentation sub-position of the Feed stream information presentation position; and determining a third presentation sub-position within the first presentation sub-position, and presenting the dynamic tag at the third presentation sub-position.

In an optional implementation, under the condition that a plurality of the dynamic tags are obtained, the method further includes: receiving a trigger operation on the target search recommendation word, presenting an extension window in the target page, and presenting a plurality of target search recommendation words corresponding to the dynamic tags in the extension window; receiving a selection operation on the plurality of target search recommendation words, and obtaining a target object matching a dynamic tag corresponding to a target search recommendation word matching the selection operation; and presenting object presentation information of the target object matching the dynamic tag in the target page.

In a second aspect, the example of the disclosure provides an apparatus for presenting information. The apparatus includes: a first obtainment unit configured to obtain a dynamic tag of a target search recommendation word in response to a request for browsing a target page, where the dynamic tag is determined based on state information of a target object corresponding to the target search recommendation word; a second obtainment unit configured to determine a tag presentation form of the dynamic tag in the target page based on a recommendation type of the target search recommendation word; and a presentation unit configured to present the target search recommendation word and the dynamic tag of the target search recommendation word in the target page according to the tag presentation form.

In a third aspect, the example of the disclosure further provides a computer device. The computer device includes: a processor, a storage and a bus, where the storage stores a machine-readable instruction executable by the processor, the processor communicates with the storage through the bus when the computer device runs, and the machine-readable instruction executes steps in the first aspect or any possible embodiment in the first aspect when executed by the processor.

In a fourth aspect, the example of the disclosure further provides a computer-readable storage medium. The computer-readable storage medium stores a computer program, where the computer program executes steps in the first aspect or any possible embodiment in the first aspect when run by a processor.

It can be known from the above description that after the dynamic tag of the target search recommendation word is obtained, the tag presentation form of the dynamic tag in the target page can be determined based on the recommendation type of the target search recommendation word, and the target search recommendation word and the dynamic tag of the target search recommendation word can be presented in the target page according to the tag presentation form. Through the processing method described above, the state information of the target object corresponding to the target search recommendation word can be presented for the user in the target page. Thus, the user can more intuitively and quickly determine a recommendation reason of the target object based on the state information presented of the target object, and browsing experience of the user can be further improved.

In order to make the above objectives, features, and advantages of the disclosure clearer and more comprehensible, detailed description will be made below with reference to preferred examples and in conjunction with accompanying drawings.

BRIEF DESCRIPTION OF THE DRAWINGS

The accompanying drawings are used for providing further understanding of the disclosure as a constituent part of the description, serve to explain the disclosure together with examples of the disclosure, but do not constitute limitation to the disclosure. In the accompanying drawings:

FIG. 3 shows a flowchart of a method for presenting a target search recommendation word and a dynamic tag of the target search recommendation word in a target page according to a tag presentation form according to an example of the disclosure;

DETAILED DESCRIPTION OF EMBODIMENTS

Figure 1:
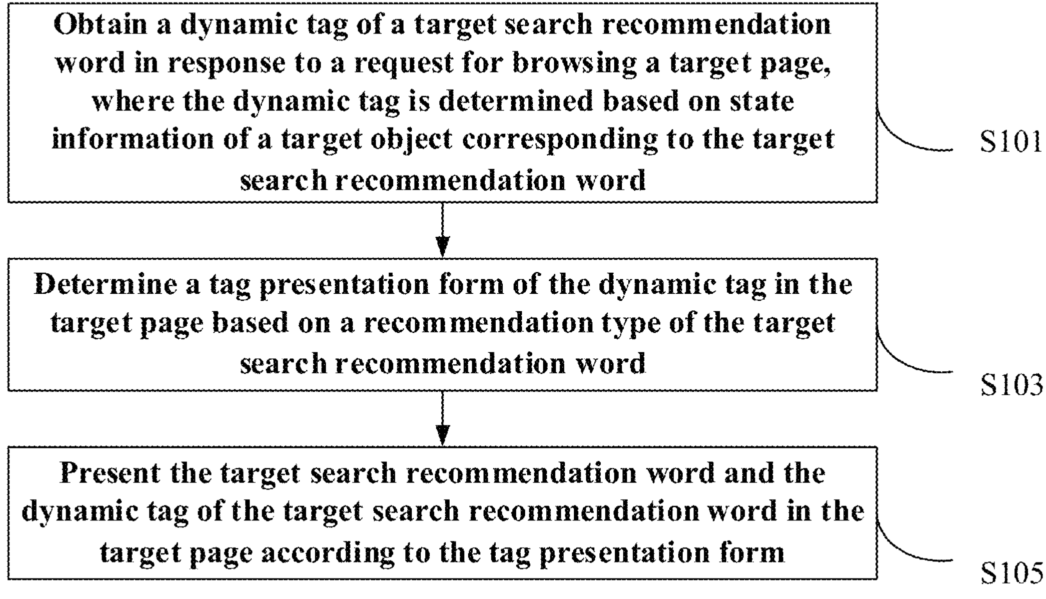
FIG. 1 shows a flowchart of a method for presenting information according to an example of the disclosure.

To make objectives, technical solutions, and advantages of examples of the disclosure clearer, the technical solutions in the examples of the disclosure will be clearly and completely described below with reference to accompanying drawings in the examples of the disclosure. Apparently, the examples described are merely some examples rather than all examples of the disclosure. In general, components that are described and shown in the accompanying drawings herein in the examples of the disclosure can be arranged and designed in various configurations. As a result, the detailed description of the examples of the disclosure as provided in the accompanying drawings below is not intended to limit the protection scope claimed by the disclosure, but merely denotes selected examples of the disclosure. All other examples derived by a person of ordinary skill in the art from the examples of the disclosure without creative efforts should fall within the protection scope of the disclosure.

It should be noted that similar reference numerals and letters indicate similar items in the following accompanying drawings, once defined in one accompanying drawing, an item does not need to further defined and explained in subsequent accompanying drawings.

The word "and/or" herein merely describes an association and indicates existence of three relations, for example, A and/or B can mean existence of A alone, existence of both A and B, and existence of B alone. In addition, the word "at least one" herein indicates any one or any combination of at least two of a variety, for example, including at least one of A, B and C can indicate including any one or more elements selected from a set of A, B and C.

It is found through research that with the development and popularization of Internet technology, online shopping has become a preferred shopping mode since it is free of time and geographical restrictions. Related technology can push search words to a user in related pages. As static recommendation information, the search words describe static information of target goods, for example, names or key description information of the goods. In this case, the user cannot know a recommendation reason of the search word on an application. For example, the user will not trigger the search word since offer information of a search object corresponding to the search word is unavailable, reducing a trigger rate of such a search word.

Based on the research, the disclosure provides a method and apparatus for presenting information, a computer device, and a storage medium. In the example of the disclosure, after a dynamic tag of a target search recommendation word is obtained, a tag presentation form in a target page of the dynamic tag can be determined based on a recommendation type of the target search recommendation word, and the target search recommendation word and the dynamic tag of the target search recommendation word can be presented in the target page according to the tag presentation form. Through the processing method described above, state information of a target object corresponding to the target search recommendation word can be presented for the user in the target page. Thus, the user can more intuitively and quickly determine a recommendation reason of the target object based on the state information presented of the target object, and browsing experience of the user can be further improved.

In order to understand this example conveniently, a method for presenting information disclosed according to the example of the disclosure is described in detail at first.

An execution subject of the method for presenting information according to the example of the disclosure is generally a computer device that has a computation capacity.

As shown in FIG. 1, a flowchart of a method for presenting information is shown according to an example of the disclosure. The method includes S101-S105.

S101: A dynamic tag of a target search recommendation word is obtained in response to a request for browsing a target page, where the dynamic tag is determined based on state information of a target object corresponding to the target search recommendation word.

Herein, the target page may be understood as a presentation interface of an application that has a search function in a mobile wordinal device. For example, the application may be an online shopping application or a news and current affairs application.

Herein, the target object is related to a type of the application, that is, the target object may be understood as an object that may be searched in the application.

For example, for the online shopping application, the target object may be understood as goods presented in a presentation interface of the application. For example, the target object may be a suspender skirt being sold online, or a product such as a mobile phone being sold online.

Herein, the target search recommendation word may be understood as a recommendation word corresponding to the target object corresponding to the target search recommendation word. The target object may be an object related to an object presented in the target page.

In the example of the disclosure, a type of the target object may be the same as a type of the object presented in the target page. For example, if the object presented in the target page is a paper towel, the target object may also be the paper towel.

In addition, the type of the target object is different from but related to the type of the object presented in the target page. For example, the object presented in the target page is the paper towel, and the target object may also be a paper towel box.

In the example of the disclosure, the dynamic tag is used to indicate the state information of the target object corresponding to the target search recommendation word. The state information may be understood as an online state of the target object. When the online state of the target object changes, the dynamic tag of the target object changes accordingly. That is, the dynamic tag changes as the state information of the target object corresponding to the target search recommendation word changes.

For example, a target search recommendation word A exists, and at any moment A (for example, October 11), state information of a target object corresponding to the target search recommendation word A is "live streaming is on". In this case, the dynamic tag obtained of the target search recommendation word A may be "live streaming is on". At any moment B (different from any moment A, for example, November 11), state information of the target object corresponding to the target search recommendation word A is Double Eleven promotion. In this case, the dynamic tag obtained of the target search recommendation word A may be "Double Eleven promotion".

It can be known from the description that the state information may be understood as an online state of the target object. For different types of applications, online states of target objects are not exactly the same. For example, for the shopping application, the state information of the target object may include at least the following state dimensions: an offer state, a live streaming state and an updated state. The information in each state dimension may correspond to at least one dynamic tag.

For example, when the state dimension is the offer state, a dynamic tag corresponding to the offer state may be: a money-off tag (the money-off tag may also be replaced with specific money-off conditions, for example, "30 yuan discount on orders over 200 yuan"), a promotional tag (the promotional tag may also be replaced with specific promotion activities, such as "Ten billion yuan subsidy promotion (TBYSP)"), and a flash sale tag. A dynamic tag corresponding to a live streaming state may be: live streaming+live streamer name, live streaming+live streamer type (an influencer or a star). A dynamic tag corresponding to the updated state may be: updated tag+updated type. The updated type may be new product listing and product version update listing.

In the example of the disclosure, the dynamic tag of the target search recommendation word may be determined based on state information of the target object in at least one state dimension.

It is assumed that the state dimensions include: an offer state, the live streaming state and the updated state. If the target search recommendation word is an "outerwear suspender skirt", the state information of the target object "suspender skirt" corresponding to the target search recommendation word "outerwear suspender skirt" in the state dimensions may be obtained, and the dynamic tag of the target search recommendation word may be determined based on the state information of the target object "suspender skirt" in the state dimensions. For example, the state information of the target object "suspender skirt" in the state dimensions include: a money-off event in the offer state (for example, 30 yuan discount on orders over 200 yuan) and a live streaming event in a live streaming state. In this case, the dynamic tags of the target search recommendation word corresponding to the target object "suspender skirt" may be at least one of the following: "30 yuan discount on orders over 200 yuan" and "a live streamer A does live streaming".

In addition, in the example of the disclosure, a tag type of the dynamic tag may be a text tag, that is, a presented content of the dynamic tag is text information. Alternatively, a tag type of the dynamic tag may be a non-text tag, for example, a graphic tag, that is, a presented content of the dynamic tag is a graphic logo having a specified shape.

S103: A tag presentation form of the dynamic tag in the target page is determined based on a recommendation type of the target search recommendation word.

In the example of the disclosure, the recommendation type of the target search recommendation word may be understood as the presentation type of the target search recommendation word in the target page. For example, the recommendation type of the target search recommendation word may be a graphic recommendation type or a text recommendation type. A target search recommendation word corresponding to the graphic recommendation type is a graphic recommendation word, and a target search recommendation word corresponding to the text recommendation type is a text recommendation word.

Under the condition that the target search recommendation word is the graphic recommendation word, the target search recommendation word may include a preview picture of the target object and key description information of the target object. Under the condition that the target search recommendation word is the text recommendation word, the target search recommendation word may include key description information of the target object.

It should be understood that a recommendation type of target search recommendation words of the same target object may be the graphic recommendation type and/or the text recommendation type. In this case, the key description information of the target object in the graphic recommendation words corresponding to the graphic recommendation type may be the same as or different from the key description information of the target object in the text recommendation words corresponding to the text recommendation type, which is not limited by the disclosure.

In the example of the disclosure, the tag presentation form of the dynamic tag in the target page may be configured to indicate at least the following information: a tag presentation content, a tag presentation position, a tag presentation size, a tag presentation state, etc. Such information corresponding to different tag presentation forms may be completely different or partially different.

Herein, the tag presentation content is configured to indicate a content included in the dynamic tag, for example, a text or a graphic included in the dynamic tag. The tag presentation position is configured to indicate a presentation position of the dynamic tag in the target page. A tag presentation size is configured to indicate a presentation size of the dynamic tag in the target page. The tag presentation state is configured to indicate a presentation state of the dynamic tag in the target page, for example, a presentation shape, a presentation color, a presentation effect and other state information.

For example, under the condition that the recommendation type of the target search recommendation word is the graphic recommendation type, the target search recommendation word is the graphic recommendation word. In this case, the tag presentation position may be determined based on a position of the preview picture in the graphic recommendation word. For example, the tag presentation position may be a upper left corner of the position of the preview picture. The tag presentation size may be determined based on the presentation size of the preview picture in the graphic recommendation word. For example, the tag presentation size may be one tenth of the presentation size of the preview picture, or the tag presentation size may be a fixed size (for example, 3 mm*3 mm).

S105: The target search recommendation word and the dynamic tag of the target search recommendation word are presented in the target page according to the tag presentation form.

It can be known from the above description that after the dynamic tag of the target search recommendation word is obtained, the tag presentation form of the dynamic tag in the target page can be determined based on the recommendation type of the target search recommendation word, and the target search recommendation word and the dynamic tag of the target search recommendation word can be presented in the target page according to the tag presentation form. Through the processing method described above, the state information of the target object corresponding to the target search recommendation word can be presented for the user in the target page. Thus, the user can more intuitively and quickly determine the recommendation reason of the target object based on the state information presented of the target object, and the browsing experience of the user can be further improved.

In an optional implementation, the target search recommendation word corresponds to a plurality of target objects, and the plurality of target objects are objects that belong to at least one object category and are determined based on an interactive operation between the user and the target page. The interactive operation includes at least one of the following: a browsing operation, a purchasing operation, a bookmarking operation and a searching operation.

In the example of the disclosure, a target search recommendation word may be determined based on an object included in the target page in response to the request for browsing of the target page. The object included in the target page is related to the target object corresponding to the target search recommendation word. The target search recommendation words may correspond to a plurality of target objects, and the plurality of target objects may belong to at least one object category.

Herein, the object category is related to a type of the application described above. For example, for the shopping application, the object category may be divided into two dimensions, one is a goods category, and the other is a merchant category. It is assumed that under the condition that the target object belongs to the goods category, the target object may be any type of goods such as "pencils" and "suspender skirts". Under the condition that the target object belongs to the merchant category, the target object may be any type of Internet stores such as "some stationery store" and "some clothing store".

In the example of the disclosure, the plurality of target objects may be determined based on the interactive operation between the user and the target page. During specific implementation, an operation object corresponding to the interactive operation between the user and the target page may be determined at first, and objects that are related to the operation object and belong to at least one object category may be determined. Then, an object that has changed state information may be determined from the objects determined, and a recommendation word of the object that has changed state information is determined as the target search recommendation word. That is, the dynamic tag of the target search recommendation word is the state information of the object that has changed state information, and the target object is the object that has changed state information.

It should be noted herein that the operation object corresponding to the interactive operation may be an object (for example, "box tissues") in the goods category or an object in the merchant category (for example, "certain store").

For example, if the interactive operation is the bookmarking operation, and the operation object corresponding to the bookmarking operation may be "box tissues", objects related to this "box tissues" may be "household tissue boxes", "paper towels of some brand" and "pocket tissues". In this case, an object that has changed state information may be determined from the "household tissue boxes", "paper towels of some brand" and "pocket tissues". For example, if a change in state information of the "household tissue boxes" is detected, a target search recommendation word corresponding to the "household tissue boxes" may be determined, and a dynamic tag of the target search recommendation word may be determined based on the state information of the "household tissue boxes".

Through the processing method, the target search recommendation word can be determined based on the interactive operation between the user and the target page. Thus, a target search recommendation word that is more in line with demand of the user can be obtained, and the user experience can be improved.

Figure 2:
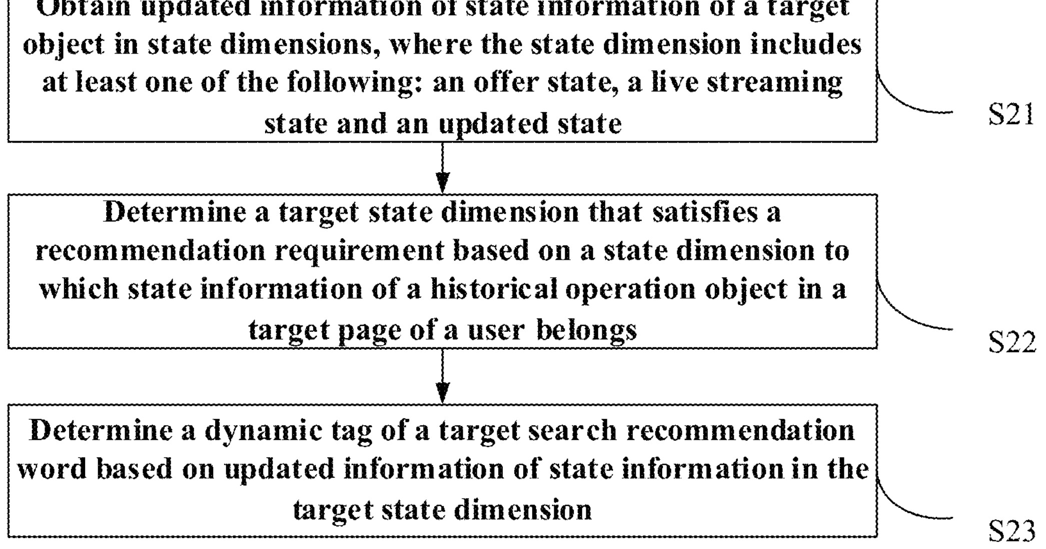
FIG. 2 shows a flowchart of a method for determining a dynamic tag of a target search recommendation word according to an example of the disclosure.

With reference to FIG. 2, FIG. 2 shows a flowchart of a method for determining a dynamic tag of a target search recommendation word according to an example of the disclosure.

In an optional implementation, as shown in FIG. 2, under the condition that the state information includes state information belonging to a plurality of state dimensions, the method according to the disclosure further includes:

S21: Updated information of state information of a target object in state dimensions are obtained, where the state dimension includes at least one of the following: an offer state, a live streaming state and an updated state.

S22: A target state dimension that satisfies a recommendation requirement is determined based on a state dimension to which state information of a historical operation object in a target page of a user belongs.

S23: The dynamic tag of the target search recommendation word is determined based on updated information of state information in the target state dimension.

In the example of the disclosure, under the condition that the state information includes state information belonging to the plurality of state dimensions, the dynamic tag of the target search recommendation word may be determined based on updated information of the state information of the target object in respective state dimensions, with a specific determination process described as the following process.

At first, the state information of the target object in respective state dimensions is obtained, and the updated information in the state information is obtained in real time. Then, a historical operation object of the user in the target page may be obtained, and state dimensions to which historical operation objects belong may be determined. A target state dimension that satisfies a recommendation requirement may be selected from the state dimensions to which the historical operation objects belong. Then, updated information of the state information in the target state dimension may be determined, and the dynamic tag of the target search recommendation word may be determined based on the updated information of the state information in the target state dimension.

Herein, the recommendation requirement is configured to indicate a determination condition for the target state dimension from the state dimensions to which the historical operation objects belong. The recommendation requirement is related to related information of the state dimension to which the state information of the historical operation object belongs. The related information includes at least one of the following: information such as update time of the state information of the historical operation object in the state dimension to which the state information belongs and an amount of state information, belonging to each state dimension, among all state information of the historical operation object.

For example, under the condition that the related information is information such as the amount of state information, belonging to each state dimension, among all the state information of the historical operation object, a state dimension including the most state information may be determined as the target state dimension. For example, under the condition that the related information is the update time of the state information of the historical operation object in the state dimension to which the state information belongs, a latest state dimension relative to the update time may be determined as the target state dimension.

In the embodiment described above, the updated information of the target object in respective state dimensions may be obtained at first, and then the target state dimension is determined based on the state dimension to which the state information of the historical operation object of the user in the target page belongs. Then, the dynamic tag of the target search recommendation words can be determined by determining the updated information in the target state dimension, such that the dynamic tag determined of the target search recommendation word is more in line with the demand of the user, and the user experience can be improved.

In an optional implementation, the example of the disclosure further includes:

S31: Search recommendation words that have updated dynamic tags are determined from a plurality of preset search recommendation words and initial search recommendation words are obtained before the step that a dynamic tag of a target search recommendation word is obtained.

S32: The target search recommendation word is determined from the initial search recommendation words based on page related information of the target page, where the page related information includes page content of the target page and/or a searching operation in the target page by a user within a preset period.

In the example of the disclosure, the plurality of preset search recommendation words may be understood as a plurality of search recommendation words predetermined by the application for the target page. A method for determining the plurality of preset search recommendation words may be as follows:

The plurality of preset search recommendation words are determined based on search recommendation words generated based on goods to which the user may be interested within a current period. Alternatively, the plurality of preset search recommendation words are determined based on search recommendation words generated in advance based on goods in a search history of the user.

For example, under the condition that the "current period" is a week before and after the Spring Festival, the plurality of search recommendation words generated based on the goods to which the user may be interested within a current period may include Spring Festival couplets, Chinese New Year coats, Chinese New Year gift boxes, etc. Under the condition that the goods in the search history of the user are suspender skirts, the plurality of search recommendation words generated based on the goods to which the user may be interested within a current period may include mori suspender skirts, bland suspender skirts, etc.

In the example of the disclosure, the search recommendation words that have the updated dynamic tags are determined from the plurality of preset search recommendation words, and the search recommendation words updated may be determined as the initial search recommendation words.

In the example of the disclosure, after the initial search recommendation words are determined, the target search recommendation word may be determined from the initial search recommendation words based on the page related information of the target page. The page related information of the target page may include the page content of the target page and/or the searching operation in the target page by the user within the preset period. The preset period is configured to indicate maximum duration from a current moment to the history that may be obtained and correspond to the searching operation in the target page by the user. For example, the preset period may be 10 minutes, 1 hour or 1 day. A specific value of the preset period is not limited in the disclosure and is subject to implementability.

During implementation, the page content of the target page may be obtained, and then a search recommendation word of an object included in the page content of the target page may be determined. Then, a search recommendation word, related to the search recommendation word determined, among the initial search recommendation words may be determined as the target search recommendation word. In addition, the searching operation in the target page by the user within the preset period may be obtained, and then the search recommendation word of the object corresponding to the searching operation in the target page by the user within the preset period may be obtained. Then, a search recommendation word, related to the search recommendation word determined, among the initial search recommendation words may be determined as the target search recommendation word.

For example, under the condition that the search recommendation word of the object corresponding to the page content of the target page is "box tissues", the search recommendation word related to the search recommendation word "box tissues" may be determined as the target search recommendation word from the initial search recommendation words (for example, the initial search recommendation words include "box tissues of certain store", "paper towels", "dresses" and "mobile phones"). That is, the target search recommendation word determined may be: "box tissues of certain store" and/or "paper towels".

One or more target search recommendation words may be determined, and a number of the target search recommendation words is not specifically limited in the disclosure, and is subject to implementability.

In the embodiment described above, the search recommendation words that have updated dynamic tags may be determined from the plurality of preset search recommendation words, and the search recommendation words that have updated dynamic tags may be determined as the initial search recommendation words. Then, the target search recommendation word may be determined from the initial search recommendation words based on the page related information of the target page. Thus, the user can receive the search recommendation word updated related to the current target page in time, time for the user to obtain the search recommendation word updated is shortened, the operation by the user is simplified and the user experience is improved.

With reference to FIG. 3, FIG. 3 shows a flowchart of a method for presenting a target search recommendation word and a dynamic tag of the target search recommendation word in a target page according to a tag presentation form according to an example of the disclosure.

In an optional implementation, as shown in FIG. 3, S105 the target search recommendation word and the dynamic tag of the target search recommendation word are presented in the target page according to the tag presentation form specifically includes:

S41: A first presentation position in a target page of a target search recommendation word is determined, where the first presentation position includes any one of the following: a page presentation area of a search middle page, a Feed stream information presentation position and a page search box.

S42: The target search recommendation word and a dynamic tag are presented in the first presentation position of the target page.

Herein, the search middle page may be understood as a page presented in the presentation interface of the mobile wordinal device in response to the interactive operation by the user on the application. The interactive operation on the application may be at least one of the following: the browsing operation and the searching operation.

Figure 4:
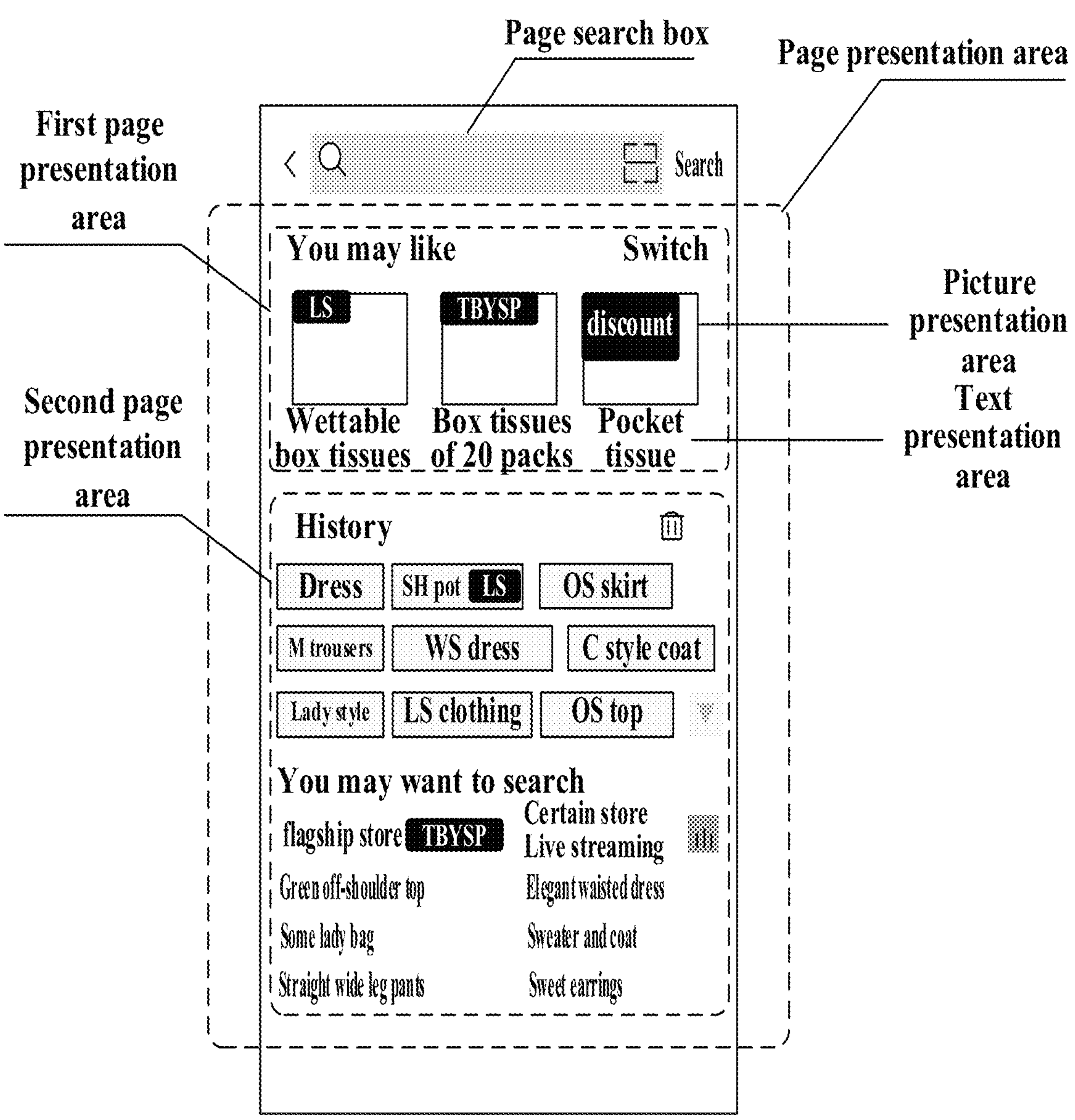
FIG. 4 shows a schematic diagram of a first presentation position being a page presentation area of a search middle page according to an example of the disclosure.

For example, under the condition that the interactive operation on the application is the searching operation, a page may be presented in the presentation interface of the mobile wordinal device in response to the searching operation, as shown in FIG. 4. FIG. 4 shows a schematic diagram of a first presentation position being a page presentation area of a search middle page according to an example of the disclosure. In this case, the page may include the following information: the page search box and the page presentation area of the search middle page.

Figure 5:
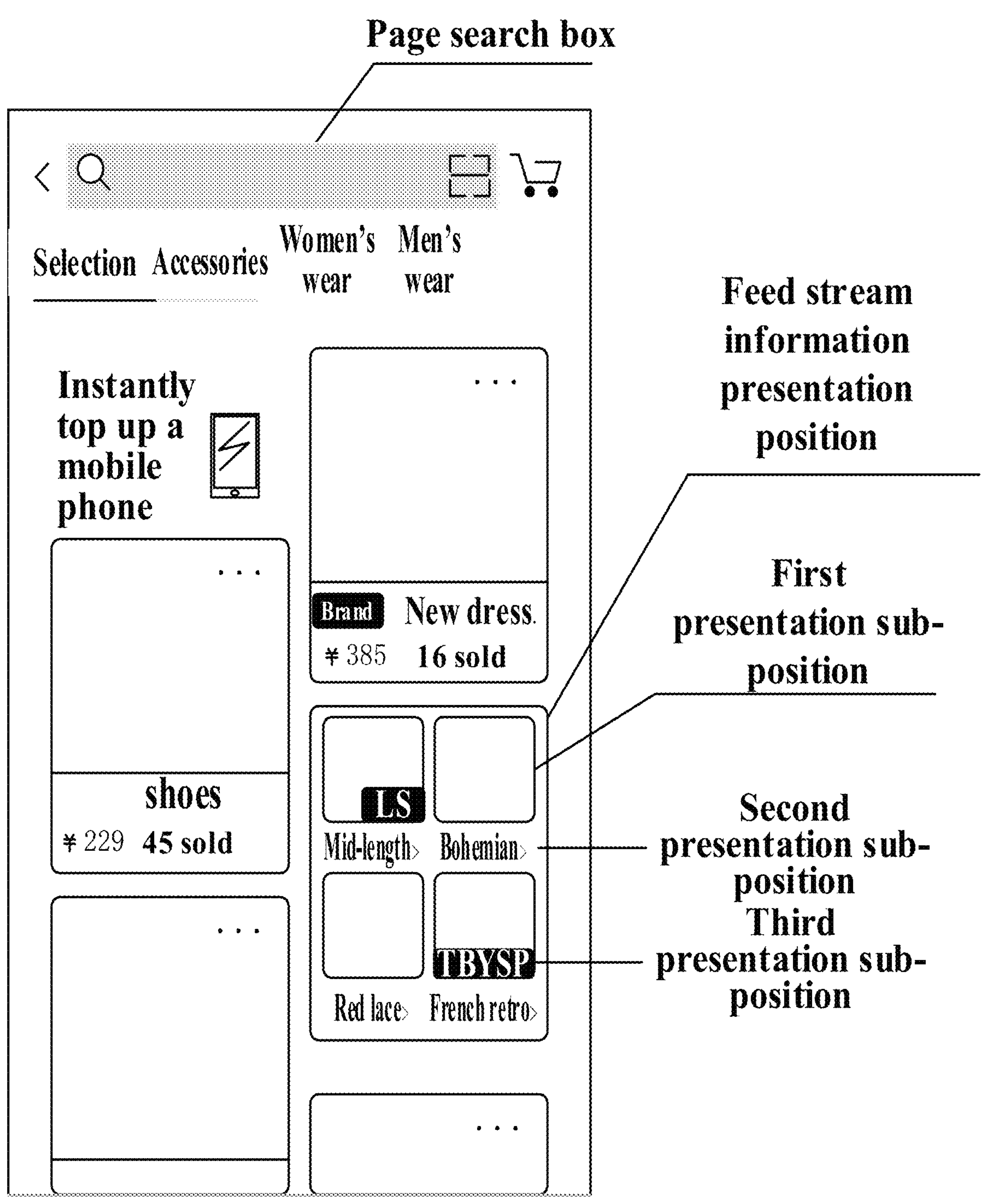
FIG. 5 shows a schematic diagram of a first presentation position being a Feed stream information presentation position according to an example of the disclosure.
Figure 6:
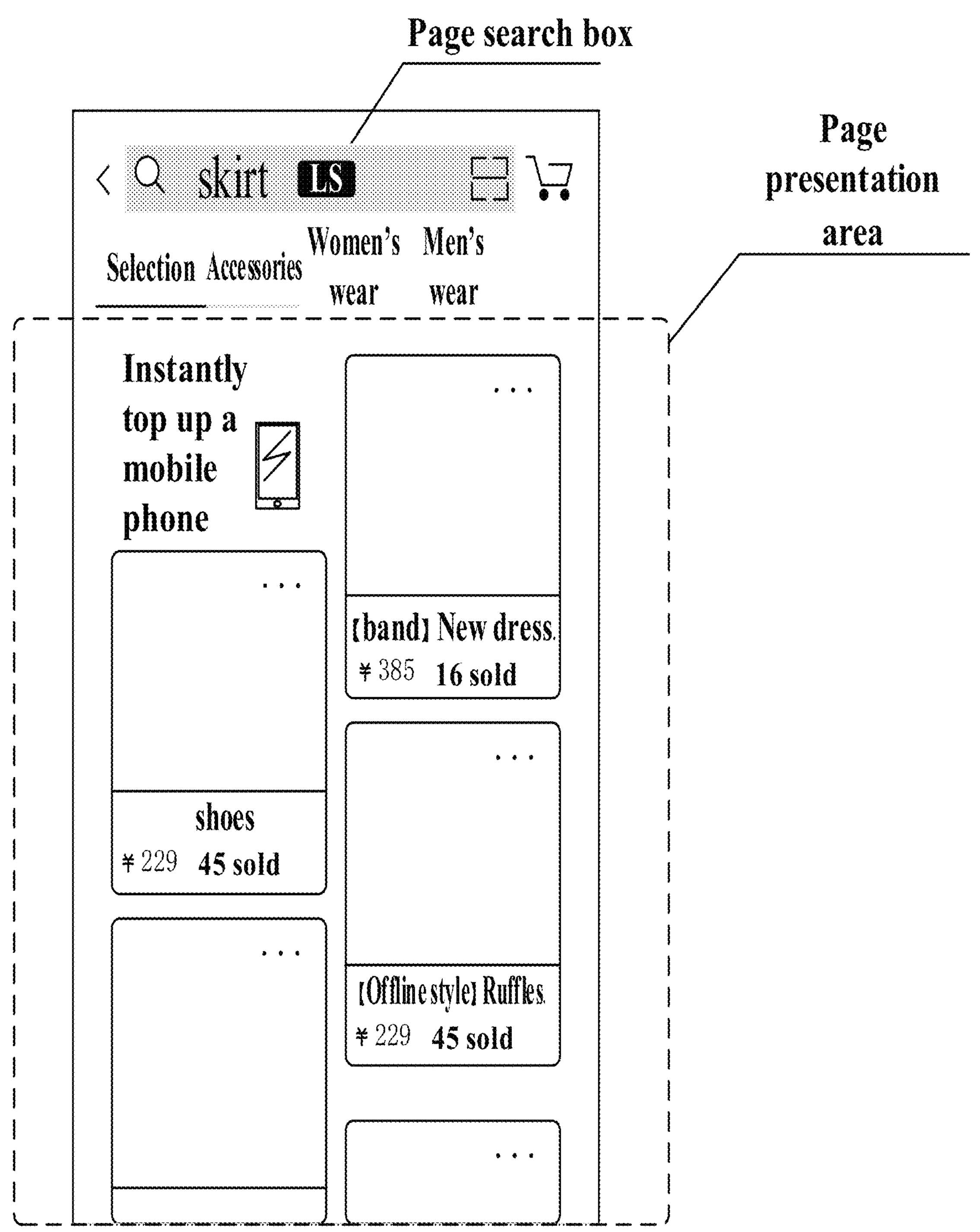
FIG. 6 shows a schematic diagram of a first presentation position being a page search box according to an example of the disclosure.

For example, under the condition that the interactive operation on the application is the browsing operation, a page may be presented in the presentation interface of the mobile wordinal device in response to the browsing operation, as shown in FIG. 5. FIG. 5 shows a schematic diagram of a first presentation position being a Feed stream information presentation position according to an example of the disclosure. In this case, the page may include the following information: the page search box and the Feed stream information presentation position. Alternatively, as shown in FIG. 6, in this case, the page may include the page search box. FIG. 6 shows a schematic diagram of a first presentation position being a page search box according to an example of the disclosure.

In addition, under the condition that the interactive operation on the application is the browsing operation, the page presented in the presentation interface of the mobile wordinal device in response to the browsing operation may also be a goods details page of goods corresponding to the browsing operation. In this case, the page may include the page search box and goods details of the goods corresponding to the browsing operation.

In the example of the disclosure, after the first presentation position of the target search recommendation word in the target page is determined, the target search recommendation word and the dynamic tag of the target search recommendation word may be presented at the first presentation position.

For example, under the condition that the first presentation position is determined as the page presentation area of the search middle page, the target search recommendation word and the dynamic tag of the target search recommendation word may be presented in the page presentation area of the search middle page. For example, as shown in FIG. 4, the target search recommendation word "wettable box tissues" and the dynamic tag "live streaming" may be presented in the page presentation area. For example, the target search recommendation word "self-heating pots" and the dynamic tag "live streaming" may be presented in the page presentation area. In addition, the target search recommendation word and the dynamic tag may also be presented in the page search box as shown in FIG. 4, which will not be enumerated herein.

For example, under the condition that the first presentation position is the Feed stream information presentation position, the target search recommendation word and the dynamic tag of the target search recommendation word may be presented in the Feed stream information presentation position. For example, as shown in FIG. 5, the target search recommendation word "mid-length chiffon>" and the dynamic tag "live streaming" may be presented in the Feed stream information presentation position. For example, the target search recommendation word "French retro>" and the dynamic tag "Ten billion yuan subsidy promotion" may be presented in the Feed stream information presentation position. In addition, the target search recommendation word and the dynamic tag may also be presented in the page search box as shown in FIG. 5, which will not be enumerated herein.

Under the condition that the first presentation position is determined as the page search box, the target search recommendation word and the dynamic tag of the target search recommendation word may be presented in the page search box. For example, as shown in FIG. 6, the target search recommendation word "mid-length chiffon>" and the dynamic tag "live streaming" may be presented in the page search box. In addition, the target search recommendation word and the dynamic tag may also be presented in the page presentation area as shown in FIG. 6, which will not be enumerated herein.

In the embodiment described above, after the first presentation position in the target page is determined, the target search recommendation word and the dynamic tag may be presented at the first presentation position in the target page. Thus, the presentation position of each target search recommendation word and the dynamic tag can be determined more accurately, and more comfortable use experience can be provided for the user.

In an optional implementation, under the condition that the target search recommendation word is a graphic recommendation word, and the first presentation position is a first page presentation area of the search middle page, S41 that a first presentation position of the target search recommendation word in the target page is determined specifically includes:

S51: An operation level of a browsing operation by a user on an object that matches the target object within a first period is obtained, where the operation level is configured to indicate an operation frequency of the browsing operation.

S52: The first page presentation area is determined from page presentation areas of the search middle page based on the operation level.

In the example of the disclosure, the first period is configured to indicate maximum duration from a current moment to the history that may be obtained and correspond to the browsing operation by the user. For example, the first period may be 1 hour, 3 days or 10 days, which is not specifically limited in the disclosure.

In the example of the disclosure, the object matching the target object may be understood as an object related to the target object corresponding to the browsing operation, such as an object belonging to the same category. For example, under the condition that the target object corresponding to the browsing operation is box tissues, the object matching the target object may be box tissues belonging to different brands, or the object matching the target object may be an object related to the box tissues (for example, a tissue box).

In the example of the disclosure, under the condition that the target search recommendation word is the graphic recommendation word and the first presentation position of the target page is the first page presentation area of the search middle page, the operation level of the browsing operation may be determined by obtaining a number of operations by the user on the object matching the target object, and the first page presentation area may be determined in the page presentation area of the search middle page based on the operation level.

During specific implementation, a number of browsing operations by the user on objects matching target objects within the first period may be counted at first, and an operation level of a corresponding browsing operation may be determined based on the number of operations. Then, the operation levels of the browsing operations may be sorted (for example, sorted in a descending order based on an operation frequency of browsing operations). The browsing operation that satisfies requirements for the operation level may be determined, for example, an browsing operation with a highest operation frequency may be determined. Then, an object corresponding to the browsing operation that satisfies the requirements for the operation level may be determined, and the first page presentation area may be determined based on a presentation position determined of the object.

During specific implementation, a section area to which the object determined belongs on the target page may be determined. For example, as shown in FIG. 4, the target page includes the following section areas: you may like, history and you may want to search. In this case, the presentation position of the section area to which the object determined belongs on the target page may be determined as the first page presentation area. For example, if in the section area "you may like", the target search recommendation word and its dynamic tag may be presented in the section "you may like".

In the embodiment described above, the operation level of the browsing operation by the user on the object matching the target object within the first period may be obtained, and the first page presentation area may be determined in the page presentation area of the search middle page based on the operation level. Thus, the first page presentation area that is more in line with the demand of the user can be determined, a probability that the user clicks the target search recommendation word can be further improved, and the user experience can be further improved.

In an optional implementation, under the condition that the target search recommendation word is the graphic recommendation word, the first presentation position is the first page presentation area of the search middle page, and the first page presentation area includes a picture presentation area and a text presentation area, S42 that the target search recommendation word and a dynamic tag are presented in the first presentation position of the target page specifically includes:

S61: Picture information of the graphic recommendation word is presented in the picture presentation area, where the picture information is a preview picture of the target object.

S62: Text information of the graphic recommendation word is presented in the text presentation area, where the text information is key description information of the target object.

S63: A first tag presentation area is determined in the picture presentation area, and the dynamic tag is presented in the first tag presentation area.

In the example of the disclosure, the graphic recommendation word may be presented in the first page presentation area determined above. In this case, the first page presentation area may include the picture presentation area and the text presentation area. The picture presentation area may present picture information in the graphic recommendation word, and the text presentation area may present text information in the graphic recommendation word.

For example, the first page presentation area is shown in FIG. 4, and a preview picture of "wettable box tissues" may be presented in a picture presentation area in this first presentation area. In addition, in the first presentation area as shown in FIG. 4, key description information "wettable box tissues" of the "wettable box tissues" may be presented in a text presentation area.

In the example of the disclosure, a first tag presentation area may also be determined in the first page presentation area, and the dynamic tag of the graphic recommendation word is presented in the first tag presentation area. The first tag presentation area may be an upper left corner of the picture presentation area or a lower right corner of the picture presentation area, and the position of the first tag presentation area is not limited in the disclosure, and is subject to implementability.

For example, in the first page presentation area as shown in FIG. 4, the first tag presentation area may be set as an upper left corner of the picture presentation area, and the dynamic tag of the graphic recommendation word may be presented in the upper left corner of the picture presentation area. For example, as shown in FIG. 4, the dynamic tag "live streaming" corresponding to "wettable box tissues" may be presented in the upper left corner of the picture presentation area corresponding to "wettable box tissues".

In the embodiment described above, the picture information of the graphic recommendation word may be presented in the picture presentation area, and the text information of the graphic recommendation word may be presented in the text presentation area. The first tag presentation area is determined in the picture presentation area, and the dynamic tag of the graphic recommendation word is presented in the first tag presentation area. Thus, the target search recommendation word and the dynamic tag that are presented at the first presentation position of the target page can be clearer, and comfort of browsing of the target page by the user can be further improved.

In an optional implementation, under the condition that the target search recommendation word is the text recommendation word, and the first presentation position is the second page presentation area of the search middle page, S42 that the target search recommendation word and the dynamic tag are presented in the first presentation position of the target page specifically includes:

S71: The text recommendation word is presented in the second page presentation area, where the text recommendation word is search keyword of a corresponding target object.

S72: The dynamic tag is presented at a position, corresponding to the second page presentation area, in the target page.

In the example of the disclosure, under the condition that the target search recommendation word is the text recommendation word, the text recommendation word may be presented in the second page presentation area of the search middle page. For example, the second page presentation area is shown in FIG. 4, and text recommendation words such as "dresses" and "some flagship store" may be presented in the second page presentation area.

In the example of the disclosure, the dynamic tag of the text recommendation word may also be presented at a corresponding position of the second page presentation area. The corresponding position of the second page presentation area may be a horizontal position of an area where the text recommendation word is located, an upper left corner of the area where the text recommendation word is located, or over the area where the text recommendation word is located. The corresponding position of the second page presentation area is not specifically limited in the disclosure, and is subject to implementability.

For example, in the second page presentation area as shown in FIG. 4, the dynamic tag "live streaming" may be presented at the horizontal position of the area where the text recommendation word "self-heating pot" is located. For example, under the condition that the dynamic tag is an identification tag, the identification tag corresponding to the live streaming may be presented at the horizontal position of the area where the text recommendation word "live streaming by certain store" is located.

In the embodiment described above, the text recommendation word may be presented in the second page presentation area of the search middle page, and the dynamic tag may be presented in the position, corresponding to the second page presentation area, in the target page. Thus, more target search recommendation words and dynamic tags of the target search recommendation words can be presented in the target page, a selection range by the user can be further expanded, and richer information can be provided for the user.

In an optional implementation, under the condition that the first presentation position is the Feed stream information presentation position, S42 that the target search recommendation word and a dynamic tag are presented in the first presentation position of the target page specifically includes:

S81: A preview picture of the target object is presented at a first presentation sub-position of the Feed stream information presentation position of the target page.

S82: Key description information of the target object is presented at a second presentation sub-position of the Feed stream information presentation position.

S83: A third presentation sub-position is determined in the first presentation sub-position, and the dynamic tag is presented at the third presentation sub-position.

Herein, a Feed stream may be understood as an information stream configured to present related information of a target object continuously updated in the target page.

In the example of the disclosure, under the condition that the first presentation position is the Feed stream information presentation position, a plurality of presentation sub-positions such as a first presentation sub-position, a second presentation sub-position and a third presentation sub-position may be determined at the Feed stream information presentation position. The first presentation sub-position may present the preview picture of target object, the second presentation sub-position may present the key description information of the target object, and the third presentation sub-position may present the dynamic tag of the target object. The third presentation sub-position may be determined based on the first presentation sub-position.

In the example of the disclosure, the three presentation sub-positions may be determined based on a number of target objects obtained through update of the Feed stream information. For example, under the condition that the number of target objects obtained through update of the Feed stream information is four, the area where the Feed stream information presentation position is located may be evenly divided into four sub-areas, and each sub-area may present the target search recommendation word and the dynamic tag of one target object. Then, a first presentation position and a second presentation position may be determined in each sub-area (for example, each sub-area may be divided into an upper part and a lower part according to the ratio of 3:1, and the upper part may be determined as the first presentation sub-position and the lower part as the second presentation sub-position). After the first presentation sub-position is determined, a third presentation sub-position may be determined based on the first presentation sub-position (for example, as shown in FIG. 5, a lower right corner of the area where the first presentation sub-position is located may be determined as the third presentation sub-position). A method for determining the three presentation sub-positions of the Feed stream information presentation position is not specifically limited in the disclosure, and is subject to implementability.

For example, as shown in FIG. 5, after the browsing operation by the user on the target object "summer new dress." is detected, at least one object related to the target object "summer new dress." may be obtained through continuous update in the target page, and the target search recommendation word updated (or the target search recommendation word and the dynamic tag) of the object is presented at the Feed stream information presentation position of the target page. For example, as shown in FIG. 5, the preview picture of the target object updated may be presented at the first presentation sub-position of the Feed stream information presentation position. The key description information, such as "mid-length chiffon>", "Bohemian>", "red lace>" and "French retro>", of the target object updated may be presented at the second presentation sub-position of the Feed stream information presentation position. The dynamic tags such as "live streaming" and "Ten billion yuan subsidy promotion" may be presented at the third presentation sub-position of the Feed stream information presentation position.

In the embodiment described above, the target search recommendation word and the dynamic tag may be presented at the Feed stream information presentation position in the target page. Thus, the user can obtain in time the target search recommendation word and the dynamic tag corresponding to the target object continuously updated, a search path for the user to obtain the target object updated is shortened and the user is provided with more interesting and richer information.

In an optional implementation, under the condition that a plurality of dynamic tags are provided, the example of the disclosure further includes:

S91: A trigger operation on the target search recommendation word is received, an extension window is presented in the target page, and a plurality of target search recommendation words corresponding to the dynamic tags are presented in the extension window.

S92: A selection operation on the plurality of target search recommendation words is received, and a target object matching a dynamic tag corresponding to a target search recommendation word matching the selection operation is obtained.

S93: Object presentation information of the target object matched is presented in the target page.

In the example of the disclosure, the trigger operation on the target search recommendation word may be any of the following: triggering the target search recommendation word in the page search box, triggering the target search recommendation word in the page presentation area of the search middle page, and triggering the target search recommendation word at the Feed stream information presentation position.

In the example of the disclosure, the plurality of dynamic tags may be provided. In this case, after the trigger operation on the target search recommendation word is received, the extension window is presented in the target page, and a plurality of target search recommendation words corresponding to the dynamic tags are presented in the extension window. Then, by receiving the selection operation on the plurality of target search recommendation words, the target object and the dynamic tag that match the selection operation are obtained, and the target object matching the target object and the dynamic tag that are matched is determined. Then, the object presentation information of the target object matched may be presented in the target page.

The object presentation information of the target object may include at least the following information: the preview picture of the target object and the key description information of the target object.

In the embodiment described above, under the condition that the plurality of dynamic tags are provided, a window may be provided for the user to select, and more accurate object presentation information of the target object may be provided for the user in the target page through the selection operation by the user. Thus, time for the user to accurately search for the target object is shortened and search efficiency of the user is improved.

It can be understood by those skilled in the art that in the method of specific embodiments, a description order of the steps does not indicate a strict execution order or constitute any limitation to an implementation process, and a specific execution order of the steps should be determined according to their functions and possible internal logic.

Based on the same inventive concept, the example of the disclosure further provides an apparatus for presenting information corresponding to the method for presenting information. Since the principle of solving problems by the apparatus in the example of the disclosure is similar to that of the method for presenting information in the example of the disclosure, reference can be made to the implementation of the method for implementation of the apparatus, with repeated contents not to be repeated herein.

Figure 7:
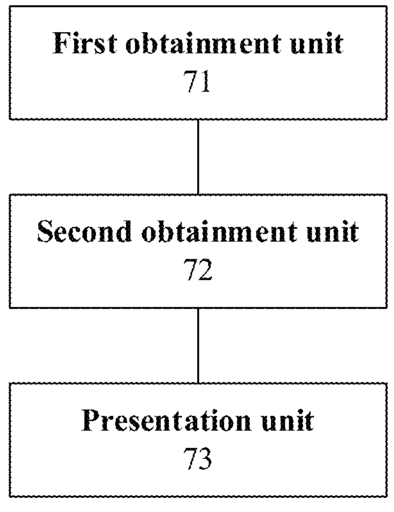
FIG. 7 shows a schematic diagram of an apparatus for presenting information according to an example of the disclosure.

As shown in FIG. 7, a schematic diagram of an apparatus for presenting information is shown according to an example of the disclosure. The apparatus includes a first obtainment unit 71, a second obtainment unit 72 and a presentation unit 73.

The first obtainment unit 71 is configured to obtain a dynamic tag of a target search recommendation word in response to a request for browsing a target page, where the dynamic tag is determined based on state information of a target object corresponding to the target search recommendation word.

The second obtainment unit 72 is configured to determine a tag presentation form of the dynamic tag in the target page based on a recommendation type of the target search recommendation word.

The presentation unit 73 is configured to present the target search recommendation word and the dynamic tag of the target search recommendation word in the target page according to the tag presentation form.

It can be known from the above description that after the dynamic tag of the target search recommendation word is obtained, the tag presentation form of the dynamic tag in the target page can be determined based on the recommendation type of the target search recommendation word, and the target search recommendation word and the dynamic tag of the target search recommendation word can be presented in the target page according to the tag presentation form. Through the processing method described above, the state information of the target object corresponding to the target search recommendation word can be presented for the user in the target page. Thus, the user can more intuitively and quickly determine a recommendation reason of the target object based on the state information presented of the target object, and browsing experience of the user can be further improved.

In a possible embodiment, the first obtainment unit is further configured as follows: the target search recommendation word corresponds to a plurality of target objects, and the plurality of target objects are objects that belong to at least one object category and are determined based on an interactive operation between a user and the target page, where the interactive operation includes at least one of the following: a browsing operation, a purchasing operation, a bookmarking operation and a searching operation.

In a possible embodiment, the first obtainment unit is further configured to: obtain updated information of state information of the target object in respective state dimensions, where the state dimension includes at least one of the following: an offer state, a live streaming state and an updated state; determine a target state dimension that satisfies a recommendation requirement based on a state dimension to which state information of a historical operation object of the user in the target page belongs; and determine the dynamic tag of the target search recommendation word based on updated information of state information in the target state dimension under the condition that the state information includes state information belonging to a plurality of state dimensions.

In a possible embodiment, the first obtainment unit is further configured to: determine search recommendation words that have updated dynamic tags from a plurality of preset search recommendation words and obtain initial search recommendation words before the obtaining the dynamic tag of the target search recommendation word; and determine the target search recommendation word from the initial search recommendation words based on page related information of the target page, where the page related information includes page content of the target page and/or a searching operation in the target page by a user within a preset period.

In a possible embodiment, the presentation unit is further configured to: determine a first presentation position in a target page of a target search recommendation word, where the first presentation position includes any one of the following: a page presentation area of a search middle page, a Feed stream information presentation position and a page search box; and present the target search recommendation word and the dynamic tag in the first presentation position of the target page.

In a possible embodiment, the presentation unit is further configured to obtain an operation level of a browsing operation by a user on an object that matches the target object within a first period, where the operation level is configured to indicate an operation frequency of the browsing operation; and determine the first page presentation area from page presentation areas of the search middle page based on the operation level under the condition that the target search recommendation word is a graphic recommendation word, and the first presentation position is a first page presentation area of the search middle page.

In a possible embodiment, the presentation unit is further configured to present picture information of the graphic recommendation word in the picture presentation area, where the picture information is a preview picture of the target object; present text information of the graphic recommendation word in the text presentation area, where the text information is key description information of the target object; and determine a first tag presentation area in the picture presentation area, and present the dynamic tag in the first tag presentation area under the condition that the first page presentation area includes a picture presentation area and a text presentation area.

In a possible embodiment, the presentation unit is further configured to present the text recommendation word in the second page presentation area, where the text recommendation word is search keyword of a corresponding target object; and present the dynamic tag at a position, corresponding to the second page presentation area, in the target page under the condition that the target search recommendation word is a text recommendation word, and the first presentation position is a second page presentation area of the search middle page.

In a possible embodiment, the presentation unit is further configured to present a preview picture of the target object at a first presentation sub-position of the Feed stream information presentation position of the target page; present key description information of the target object at a second presentation sub-position of the Feed stream information presentation position; and determine a third presentation sub-position within the first presentation sub-position, and present the dynamic tag at the third presentation sub-position under the condition that the first presentation position is a Feed stream information presentation position.

In a possible embodiment, the presentation unit is further configured to receive a trigger operation on the target search recommendation word, present an extension window in the target page, and present a plurality of target search recommendation words corresponding to the dynamic tags in the extension window; receive a selection operation on the plurality of target search recommendation words, and obtain a target object matching a dynamic tag corresponding to a target search recommendation word matching the selection operation; and present object presentation information of the target object matching the dynamic tag in the target page under the condition that a plurality of the dynamic tags are obtained.

For the description of the processing flow of the modules in the apparatus and the interaction flow between modules, reference can be made to the relevant description in the method example, which will not be described in detail herein.

Figure 8:
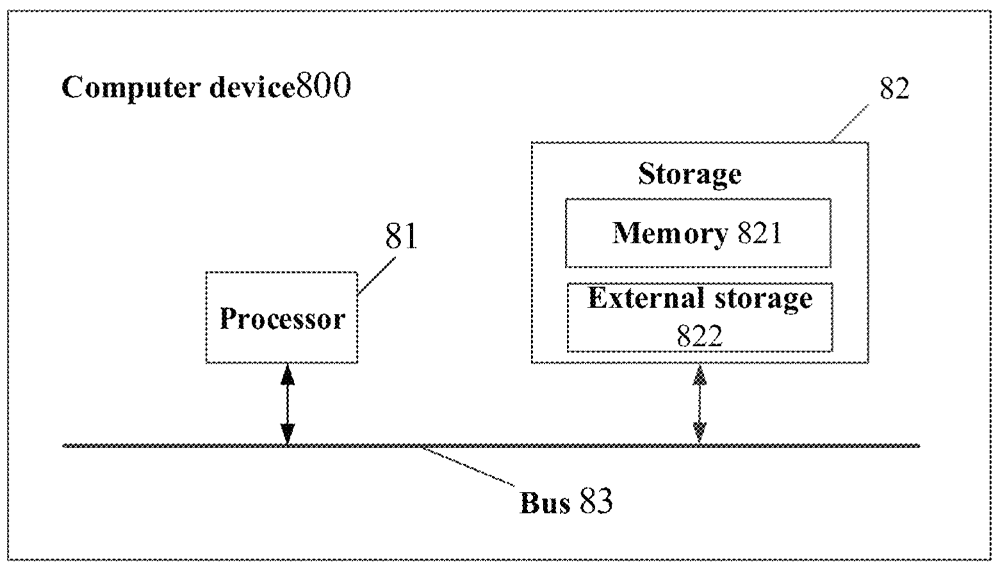
FIG. 8 is a schematic diagram of a computer device according to an example of the disclosure.

Corresponding to the method for presenting information in FIG. 1, the example of the disclosure further provides a computer device 800. As shown in FIG. 8, a structural schematic diagram of the computer device 800 is shown according to the example of the disclosure. The computer device includes:

a processor 81, a storage 82, and a bus 83. The storage 82 is configured to store execution instructions, including a memory 821 and an external storage 822. The memory 821 herein is also referred to as an internal storage, and is configured to temporarily store operation data in the processor 81 and data exchanged with the external storage 822 such as a hard disk. The processor 81 exchanges data with the external storage 822 through the memory 821, and when the computer device 800 runs, the processor 81 communicates with the storage 82 through the bus 83, so as to cause the processor 81 to executes the following instructions:

A dynamic tag of a target search recommendation word is obtained in response to a request for browsing a target page, where the dynamic tag is determined based on state information of a target object corresponding to the target search recommendation word.

A tag presentation form of the dynamic tag in the target page is determined based on a recommendation type of the target search recommendation word.

The target search recommendation word and the dynamic tag of the target search recommendation word are presented in the target page according to the tag presentation form.

The example of the disclosure further provides a computer-readable storage medium.

The computer-readable storage medium stores a computer program, where the computer program executes steps of the method for presenting information in the method example described above when run by a processor. The storage medium may be a volatile or nonvolatile computer-readable storage medium.

The example of the disclosure also provides a computer program product. The computer program product carries program codes, and the program codes include instructions that may be configured to execute steps of the method for presenting information in the method example described above. For details, reference can be made to the method example, which will not be repeated herein.

The computer program product may be implemented through hardware, software or their combinations. In an optional example, the computer program product is specifically embodied as a computer storage medium. In another optional example, the computer program product is specifically embodied as a software product, such as a software development kit (SDK).

Those skilled in the art can clearly understand that, for the convenience and conciseness of description, reference can be made to the corresponding processes in the method example for the specific working processes of the above system and apparatus, which will not be repeated herein. It should be understood that in the several examples provided by the disclosure, the system, the apparatus and the method disclosed can be implemented in other methods. The apparatus embodiments described above are merely schematic. For example, unit division is merely a logical function division and can have other division manners during actual implementation, for example, a plurality of units or components may be combined or integrated into another system, or some features can be omitted or not executed. On the other hand, the shown or discussed coupling or direct coupling or communication connection with each other can be indirect coupling or communication connection through some communication interfaces, apparatuses or units, and can be in electrical, mechanical or other forms.

The units described as separated parts can be physically separated or not, and the parts displayed as units can be physical units or not, that is, they can be located in one place or distributed to a plurality of network units. Some or all units can be selected according to actual needs to achieve the purposes of the solutions of the examples.

In addition, functional units in the examples of the disclosure may be integrated into one processing unit, or each unit may be physically present separately, or two or more units may be integrated into one unit.

If the functions are implemented in the form of the software functional units and sold or used as independent products, the functions can be stored in a processor-executable non-volatile computer-readable storage medium. Based on such understanding, the technical solution of the disclosure can be embodied in the form of software products in essence or a part that contributes to the prior art or a part thereof, the computer software products are stored in the storage medium, and include several instructions to make one piece of computer device (which can be a personal computer, a server, a network device, etc.) execute all or some steps of the method of the examples of the disclosure. The foregoing storage medium includes a USB flash drive, a read-only memory (ROM), a random access memory (RAM), a diskette or an optical disk, etc., which may store program codes.

Finally, it should be noted that the above examples are merely specific embodiments of the disclosure, and are used to describe the technical solution of the disclosure, rather than limit the same, and the protection scope of the disclosure is not limited thereto. Although the disclosure has been described in detail with reference to the foregoing examples, those skilled in the art should understand that the technical solution described in the foregoing examples can be still modified or conceivably changed, or some of the technical features therein can be equivalently replaced. However, these modifications, changes or equivalent replacements are not intend to depart the essence of the corresponding technical solutions from the spirit and scope of the technical solutions of the example of the disclosure, and should fall within the protection scope of the disclosure. Thus, the protection scope of the disclosure should be subject to a protection scope of the claims.

I claim:

1. A method for improving display of information by an application, comprising:

determining, in response to a request for browsing a page of the application, a search recommendation word that is related to content displayed on the page of the application;

determining state information of an object corresponding to the search recommendation word, wherein the state information indicates an online status associated with the object;

obtaining a dynamic tag of the search recommendation word, wherein the dynamic tag comprises a user interface element indicating the state information of the object;

determining, based on determining whether the search recommendation word comprises text or a graphic, a tag presentation form of the dynamic tag, wherein the tag presentation form indicates at least a display position for the dynamic tag, relative to the search recommendation word, that improves visibility of the state information of the object on the page of the application; and presenting, according to the tag presentation form and in the page of the application, the search recommendation word and the dynamic tag of the search recommendation word.

2. The method of claim 1, wherein the search recommendation word corresponds to a plurality of objects, and the plurality of objects are objects that belong to at least one object category and are determined based on an interactive operation between a user and the page, wherein the interactive operation comprises at least one of the following: a browsing operation, a purchasing operation, a bookmarking operation, or a searching operation.

3. The method of claim 1, wherein the state information comprises state information belonging to a plurality of state dimensions, and the method further comprises:

obtaining updated information of state information of the object in respective state dimensions, wherein the state dimension comprises at least one of the following: an offer state, a live streaming state and an updated state;

determining, based on a state dimension to which state information of a historical operation object of the user in the page belongs, a state dimension that satisfies a recommendation requirement; and determining, based on updated information of state information in the state dimension, the dynamic tag of the search recommendation word.

4. The method of claim 1, further comprising:

determining, before the obtaining the dynamic tag of the search recommendation word, search recommendation words that have updated dynamic tags from a plurality of preset search recommendation words and obtaining initial search recommendation words; and determining, based on page related information of the page and from the initial search recommendation words, the search recommendation word, wherein the page related information comprises page content of the page and/or a searching operation in the page by a user within a preset period.

5. The method of claim 1, wherein the presenting, according to the tag presentation form and in the page, the search recommendation word and the dynamic tag of the search recommendation word comprises:

determining a first presentation position of the search recommendation word in the page, wherein the first presentation position comprises any one of the following: a page presentation area of a search middle page, a Feed stream information presentation position and a page search box; and presenting, in the first presentation position of the page, the search recommendation word and the dynamic tag.

6. The method of claim 5, wherein the search recommendation word is a graphic recommendation word, and the first presentation position is a first page presentation area of the search middle page; and the determining the first presentation position of the search recommendation word in the page comprises:

obtaining an operation level of a browsing operation by a user on an object that matches the object within a first period, wherein the operation level is configured to indicate an operation frequency of the browsing operation; and determining, based on the operation level, the first page presentation area from respective page presentation areas of the search middle page.

7. The method of claim 6, wherein the first page presentation area comprises a picture presentation area and a text presentation area; and the presenting, in the first presentation position of the page, the search recommendation word and the dynamic tag comprises:

presenting, in the picture presentation area, picture information of the graphic recommendation word, wherein the picture information is a preview picture of the object;

presenting text information of the graphic recommendation word in the text presentation area, wherein the text information is key description information of the object; and determining a first tag presentation area in the picture presentation area, and presenting the dynamic tag in the first tag presentation area.

8. The method of claim 5, wherein the search recommendation word is a text recommendation word, and the first presentation position is a second page presentation area of the search middle page; and the presenting the search recommendation word and the dynamic tag in the first presentation position of the page comprises:

presenting, in the second page presentation area, the text recommendation word, wherein the text recommendation word is search keyword of a corresponding object; and presenting the dynamic tag at a position in the page corresponding to the second page presentation area.

9. The method of claim 5, wherein the first presentation position is a Feed stream information presentation position; and the presenting the search recommendation word and the dynamic tag in the first presentation position of the page comprises:

presenting a preview picture of the object at a first presentation sub-position of the Feed stream information presentation position of the page;

presenting key description information of the object at a second presentation sub-position of the Feed stream information presentation position; and determining a third presentation sub-position within the first presentation sub-position, and presenting the dynamic tag at the third presentation sub-position.

10. The method of claim 1, wherein a plurality of the dynamic tags are obtained, and the method further comprises:

receiving a trigger operation on the search recommendation word, presenting an extension window in the page, and presenting, in the extension window, a plurality of search recommendation words corresponding to the dynamic tags;

receiving a selection operation on the plurality of search recommendation words, and obtaining a object matching a dynamic tag corresponding to a search recommendation word matching the selection operation; and presenting object presentation information of the object matching the dynamic tag in the page.

11. A computer device, comprising: a processor, a memory and a bus, wherein the memory stores machine-readable instructions executable by the processor, the processor communicates with the memory via the bus when the computer device runs, and the machine-readable instruction, when executed by the processor, causes the processor to:

determine, in response to a request for browsing a page of an application, a search recommendation word that is related to content displayed on the page of the application;

determine state information of an object corresponding to the search recommendation word, wherein the state information indicates an online status associated with the object;

obtain a dynamic tag of the search recommendation word, wherein the dynamic tag comprises a user interface element indicating the state information of the object;

determine, based on determining whether the search recommendation word comprises text or a graphic, a tag presentation form of the dynamic tag, wherein the tag presentation form indicates at least a display position for the dynamic tag, relative to the search recommendation word, that improves visibility of the state information of the object on the page of the application; and present, according to the tag presentation form and in the page of the application, the search recommendation word and the dynamic tag of the search recommendation word.

12. A non-transitory computer-readable storage medium, having stored a computer program thereon, wherein the computer program, when run by a processor, causes the processor to:

determine, in response to a request for browsing a page of an application, a search recommendation word that is related to content displayed on the page of the application;

determine state information of an object corresponding to the search recommendation word, wherein the state information indicates an online status associated with the object;

obtain a dynamic tag of the search recommendation word, wherein the dynamic tag comprises a user interface element indicating the state information of the object;

determine, based on determining whether the search recommendation word comprises text or a graphic, a tag presentation form of the dynamic tag, wherein the tag presentation form indicates at least a display position for the dynamic tag, relative to the search recommendation word, that improves visibility of the state information of the object on the page of the application; and present, according to the tag presentation form and in the page of the application, the search recommendation word and the dynamic tag of the search recommendation word.

13. The computer device of claim 11, wherein the search recommendation word corresponds to a plurality of objects, and the plurality of objects are objects that belong to at least one object category and are determined based on an interactive operation between a user and the page, wherein the interactive operation comprises at least one of the following: a browsing operation, a purchasing operation, a bookmarking operation, or a searching operation.

14. The computer device of claim 11, wherein the state information comprises state information belonging to a plurality of state dimensions, and the method further comprises:

obtaining updated information of state information of the object in respective state dimensions, wherein the state dimension comprises at least one of the following: an offer state, a live streaming state and an updated state;

determining, based on a state dimension to which state information of a historical operation object of the user in the page belongs, a state dimension that satisfies a recommendation requirement; and determining, based on updated information of state information in the state dimension, the dynamic tag of the search recommendation word.

15. The computer device of claim 11, the process is further caused to:

determine, before the obtaining the dynamic tag of the search recommendation word, search recommendation words that have updated dynamic tags from a plurality of preset search recommendation words and obtaining initial search recommendation words; and determine, based on page related information of the page and from the initial search recommendation words, the search recommendation word, wherein the page related information comprises page content of the page and/or a searching operation in the page by a user within a preset period.

16. The computer device of claim 11, wherein a plurality of the dynamic tags are obtained, and the method further comprises:

receiving a trigger operation on the search recommendation word, presenting an extension window in the page, and presenting, in the extension window, a plurality of search recommendation words corresponding to the dynamic tags;

receiving a selection operation on the plurality of search recommendation words, and obtaining a object matching a dynamic tag corresponding to a search recommendation word matching the selection operation; and presenting object presentation information of the object matching the dynamic tag in the page.

17. The non-transitory computer-readable storage medium of claim 12, wherein the presenting, according to the tag presentation form and in the page, the search recommendation word and the dynamic tag of the search recommendation word comprises:

determining a first presentation position of the search recommendation word in the page, wherein the first presentation position comprises any one of the following: a page presentation area of a search middle page, a Feed stream information presentation position and a page search box; and presenting, in the first presentation position of the page, the search recommendation word and the dynamic tag.

18. The non-transitory computer-readable storage medium of claim 17, wherein the search recommendation word is a graphic recommendation word, and the first presentation position is a first page presentation area of the search middle page; and the determining the first presentation position of the search recommendation word in the page comprises:

obtaining an operation level of a browsing operation by a user on an object that matches the object within a first period, wherein the operation level is configured to indicate an operation frequency of the browsing operation; and determining, based on the operation level, the first page presentation area from respective page presentation areas of the search middle page.

19. The non-transitory computer-readable storage medium of claim 18, wherein the search recommendation word is a text recommendation word, and the first presentation position is a second page presentation area of the search middle page; and the presenting the search recommendation word and the dynamic tag in the first presentation position of the page comprises:

presenting, in the second page presentation area, the text recommendation word, wherein the text recommendation word is search keyword of a corresponding object; and presenting the dynamic tag at a position in the page corresponding to the second page presentation area.

20. The non-transitory computer-readable storage medium of claim 18, wherein the first presentation position is a Feed stream information presentation position; and the presenting the search recommendation word and the dynamic tag in the first presentation position of the page comprises:

presenting a preview picture of the object at a first presentation sub-position of the Feed stream information presentation position of the page;

presenting key description information of the object at a second presentation sub-position of the Feed stream information presentation position; and determining a third presentation sub-position within the first presentation sub-position, and presenting the dynamic tag at the third presentation sub-position.

* * * * *